July 15, 1969 B. D. GRINDLE ET AL 3,456,099

PULSE WIDTH MULTIPLIER OR DIVIDER

Filed Dec. 13, 1963 3 Sheets-Sheet 2

July 15, 1969 B. D. GRINDLE ET AL 3,456,099

PULSE WIDTH MULTIPLIER OR DIVIDER

Filed Dec. 13, 1963 3 Sheets-Sheet 3

United States Patent Office 3,456,099
Patented July 15, 1969

3,456,099
PULSE WIDTH MULTIPLIER OR DIVIDER

Blaine D. Grindle, Vestal, and Hermann Schmid, Binghamton, N.Y., assignors to General Electric Company, a corporation of New York Filed Dec. 13, 1963, Ser. No. 330,327
Int. Cl. G06g 7/16, 7/12
U.S. Cl. 235—195 6 Claims

ABSTRACT OF THE DISCLOSURE

An improved pulse width multiplier is provided in which simple integrators and switching circuits transform the input signals into pulse width output signals. One input rate signal is used to charge a capacitor, the other input signal cuts off capacitor integration and a reference signal is used to discharge the integrator.

This invention relates to electronic computer circuits for performing multiplication in systems in which quantities are represented by pulse width signals. The invention is particularly useful for real-time computation in automatic control systems for navigation, machine control and fire control.

Most presently known multiplication techniques, like that of the servo, the pulse time, the Hall multiplier, etc., require that one input variable be converted into another form. In the servo multiplier, e.g., one input signal must be converted from a D-C voltage to a shaft position. Only a few low-accuracy multiplication techniques, like the multigrid tube, the electron beam multiplier, etc. can accept both inputs in the same signal form directly.

In data processing systems requiring multiplication, flexibility in respect to ease of modification to increase accuracy, addition of further capabilities, or simplification to reduce costs, is severely limited because of system components requiring information in various incompatible signal forms. It is generally not practical, for example, to interchange analog and digital system components because such interchange normally requires too much signal conversion equipment and frequently the timing of required input signals and generated output signals is incompatible with the system timing.

Accordingly, it is an object of the invention to provide a multiplier which is inherently compatible with a wide variety of input and output devices, both analog and digital.

It is another object to provide a multiplier which can be implemented with either digital or analog components.

It is another object to provide a multiplier which accepts pulse width inputs and produces pulse width outputs.

It is another object of the invention to provide a multiplier which, is compatible with input signal generating circuits and output signal receiving circuits that produce or require signals in different forms, such as circuits which require D-C signals and those requiring pulse-width signals.

It is another object of the invention to provide a pulse width multiplier in which, with analog circuit implementation, the accuracy of operation is not dependent upon instantaneous voltage levels.

It is another object of the invention to provide a pulse width multiplier in which the accuracy of operation is not dependent upon complex or precision components such as with precision operational amplifiers and complex parallel digital logic circuits.

Briefly stated, in accordance with certain aspects of the invention, a pulse width multiplier is provided in which the operations critical to accuracy are switching operations. This is made possible by the use of low precision analog integrators or simple counter integrators and associated switching circuits which transform variable input signals into pulse width output product signals. In one analog form, a first input signal representing a first variable by pulse width modulation is transformed into a capacitor charging current in which the current is effectively a rate signal proportional to the first variable; and a second input signal having a pulse width modulation is arranged to cut off capacitor integration at a time corresponding to a second variable. A source of a constant reference potential discharges the integrator so that an accurate output for further computation is made available in pulse width form after the integrated voltage signal is made available.

When the pulse width multiplier invention is implemented with digital circuits, the key operations are again the reliance upon switching operations and the generation of a rate signal for one of the variables. Integration is performed by conventional counters and multipliers are adapted to receive and product pulse width signals whereby system and interface connections are inherently compatible with other pulse width devices.

The invention, together with further objects and advantages thereof, may best be understood by referring to the following description taken in conjunction with the appended drawings in which like numerals indicate like parts and in which.

Figure 1:
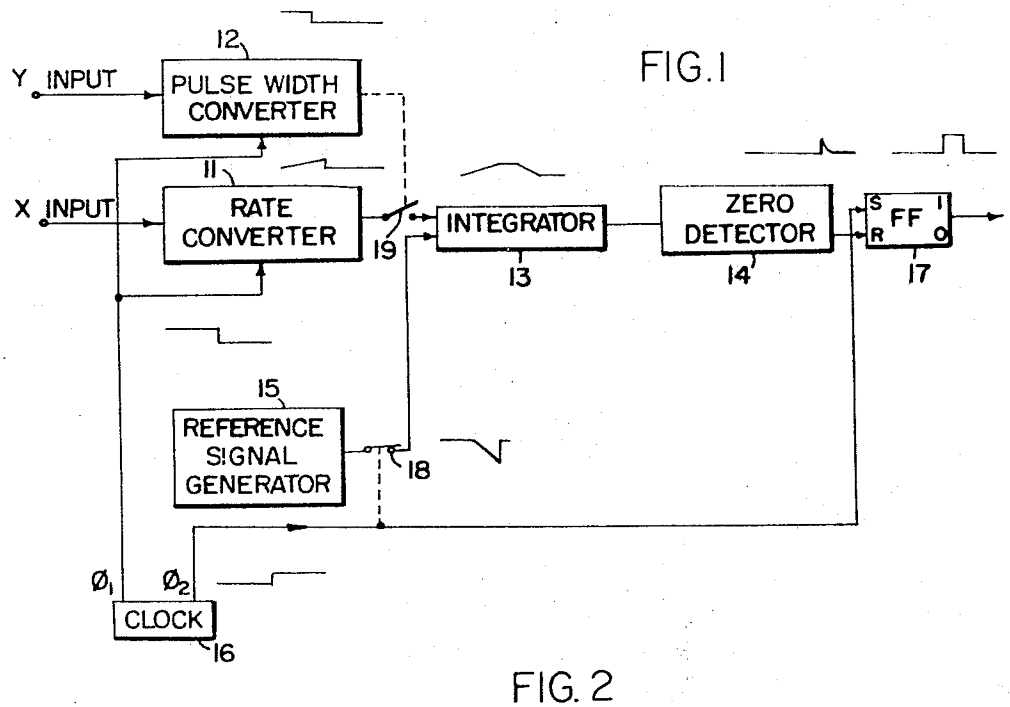
FIGURE 1 is a block diagram of the pulse width multiplier.
Figure 3:
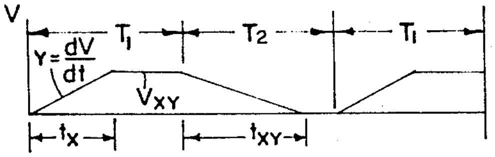
FIGURE 3 is a diagram illustrating the operation of the FIGURE 2 circuit.

Referring now to the drawings, FIGURE 1 illustrates the pulse width multiplier invention in a block diagram form generic to both analog and digital implementation. The multiplier is illustrated for general application wherein provision is made to accept, during a first half cycle $T_1$, (FIGURE 3) input signals in a variety of modulation forms including D-C voltage, pulse width, or digital modulated signals. Accordingly, first and second converters 11 and 12 are illustrated for deriving rate signals and pulse width signals for the $x$ and $y$ input signals respectively. If the input signals are already in either or both of these forms, it is unnecessary to employ the respective converters as is frequently the case with the $y$ pulse width signals. The output of rate converter 11 is an electrical rate signal which is proportional to the input signal $x$. This rate signal is applied to integrator 13 through an electronic switch 19. The output of pulse width converter 12 is a signal representing the input signal $y$ by a pulse width proportional to $y$. The electronic switch 19 is controlled by converter 12 so as to modulate the rate signal applied to an integrator 13. As a result, integrator 13 accumulates and stores a signal representing a quantity, such as charge on a capacitor or pulses in a counter, which is proportional to the product $xy$ (FIGURE 3). After the next clock pulse, which initiates the second half cycle, electronic switch 18 is closed and a reference signal generator 15 applies a reference rate signal to integrator 13 which is thereby discharged. When the integrator 13 is discharged to a zero condition, a zero cross-over detector 14 produces a pulse that resets a set reset flip-flop 17 which has been set with $\phi_2$. A multiplier output is therefore generated which is a signal having a duration proportional to $xy$.

The key features of the FIGURE 1 multiplier are the reliance on switching operations and the use of a self-referencing integration arrangement. The second feature includes several factors such as the elimination of absolute precision performance requirements on the integrator and reference signals when operating as an analog device. The actual integration values are not important because only the zero cross-over point determines the output signal and absolute values of the reference signals are not important because it is sufficient that these signals be accurate relative to the input signals. These characteristics result from the manner in which the multiplier operates which in turn is dependent on the particular mathematical relationships.

The output of integrator 13 increases linearly with time if the input to the integrator is a constant rate signal. The magnitude of the rate signal determines the slope of this increase. If the magnitude of the rate signal is proportional to the first multiplication variable X, then the time rate of change of the output of the integrator is proportional to X, i.e.

$$dZ/dt=kX \qquad (1)$$

where Z is the output of the integrator and $k$ is a constant.

The output of the integrator can be expressed $$Z=\int kxdt \qquad (2)$$

Assuming the integration process is started at time $t=0$, the output of the integrator at a specific time $t_1$ is $$Z(t_1)=\int_0^{t_1} kXdt=kX\cdot t_1-kX\cdot 0 \qquad (3)$$

When the time interval from $t=0$ to $t=t_1$ is proportional to the second multiplication variable Y, the output of the integrator is then proportional to both X and Y or proportional to the product XY, i.e., $$Z=\int_0^{k_yY} kXdt=kX[k_yY-0]=kk_yXY \qquad (4)$$

Division is performed with the FIGURE 1 pulse width multiplier by interchanging the control connections for the switches 18 and 19. If integrator 13 first integrates the reference signal for a time proportional to $y$ (by switching the reference signal generator 15 with pulse width converter 12), and then discharges integrator 13 at a rate proportional to $x$ (by switching the rate converter 11 to it), a pulse width output signal is generated proportional to $y/x$.

The FIGURE 1 pulse width multiplier inherently performs rate signal to pulse width conversion and pulse width to rate signal conversion as subsidiary operations in multiplication. Accordingly, simplified forms of the FIGURE 1 structure are suitable for performing the functions of converters 11 and 12. Where both the input signals are essentially rate signals, such as D-C voltages, the rate converter directly provides the $x$ input integrating signal. The $y$ pulse width signal is previously generated by the integration of the $y$ input signal in another integrator like 13, but the integration time is limited by a reference "1" pulse width signal applied to a switch corresponding to switch 19. The corresponding reference signal generator in discharging the integrator generates the desired $y$ pulse width signal for the multiplier.

With two pulse width input signals, provision is made for a pulse width to rate signal converter by the use of FIGURE 1 type apparatus wherein block 11 is a FIGURE 1 multiplier in itself in simplified form to operate as a pulse width to rate converter by applying a reference ($x=1$) rate signal to the integrator for $t_y$ to accumulate a multiplicand rate signal for subsequent multiplier integration in accordance with $t_x$. (The pulse width to rate integrator is dicharged cyclically, after each multiplication operation.)

Figure 2:
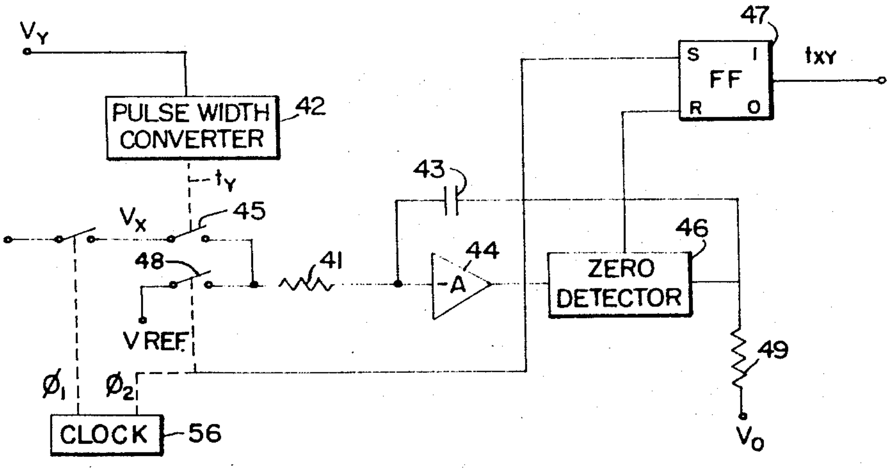
FIGURE 2 is a block diagram of the preferred embodiment of the invention with analog circuit implementation.

FIGURE 2 is a block diagram of a pulse width multiplier in which one input $x$ is in the form of a D-C voltage $V_x$ and the second input $y$ is in the form of a pulse width signal $t_y$. The input voltage $V_x$ applied to resistor 41 provides a charging current $I_x$ which is applied to the integrating capacitor 43. Linear integration is assured by the high-gain D-C amplifier 44 in accordance with the usual operational amplifier mode. After a time period proportional to the second variable $t_y$, in response to the $y$ signal from converter 42, a switch 45 (normally a solid state component) in series with the $V_x$ input opens, and the voltage across capacitor 43 is proportional to the product $xy$. This voltage is maintained during the remainder of the computer cycle period $T_1$ and is available across output resistors 49. At the beginning of $T_2$, the clock $\phi_2$ will close switch 48 which applies a reference voltage $V_R$ to the input resistor 42 to produce a discharge current $I_R$. The capacitor 43 is discharged by $I_R$ until the zero cross over level is reached at which time the comparator 46 senses the zero level to provide an output product $xy$ in pulse width form.

The primary feature of the FIGURE 2 multiplier is that the absolute performance of no component is critical to the pulse width output. Because the integrator is both filled and emptied, the absolute value of integration does not affect the pulse width output. Similarly, any long term drift of the capacitor 43 or resistor 41 does not affect the output. While the absolute value of the resistance of input resistor 42 is also noncritical; in practice, it is usually desirable that separate resistors be provided for $V_x$ and $V_R$ for signal isolation. Nevertheless, the resistors need only be matched to insure accurate operation for the pulse width output. It will be noted that although the computation requires more than a single period $T_1$, the pulse width signal is available during $T_2$.

FIGURE 3 is a waveform diagram illustrating the operation of the FIGURE 2 analog pulse width multiplier embodiment. The waveform illustrates the voltage $V_c$ developed across the integrating capacitor 43 as a function of time. The multiplication operation is initiated by the clock pulse $\phi_1$ at the beginning of half cycle $T_1$ which couples the input voltage $V_x$ to the capacitor, producing the ramp voltage waveform having a slope proportional to $V_x$. After the time $t_y$, the input voltage $V_x$ is disconnected from the capacitor 43 so that $V_c$ is proportional to the product $xy$. While this signal is proportional to the desired output, an accurate output pulse width signal is derived by applying the read-out reference voltage $V_R$ to capacitor 43 in the same manner as input voltage $V_x$. System synchronization is assured by starting the read-out period with clock $\phi_2$. The output pulse is self terminating in that the detector 46 terminates the output pulse at the zero cross-over of capacitor 43 under the control of comparator 16.

Figure 4:
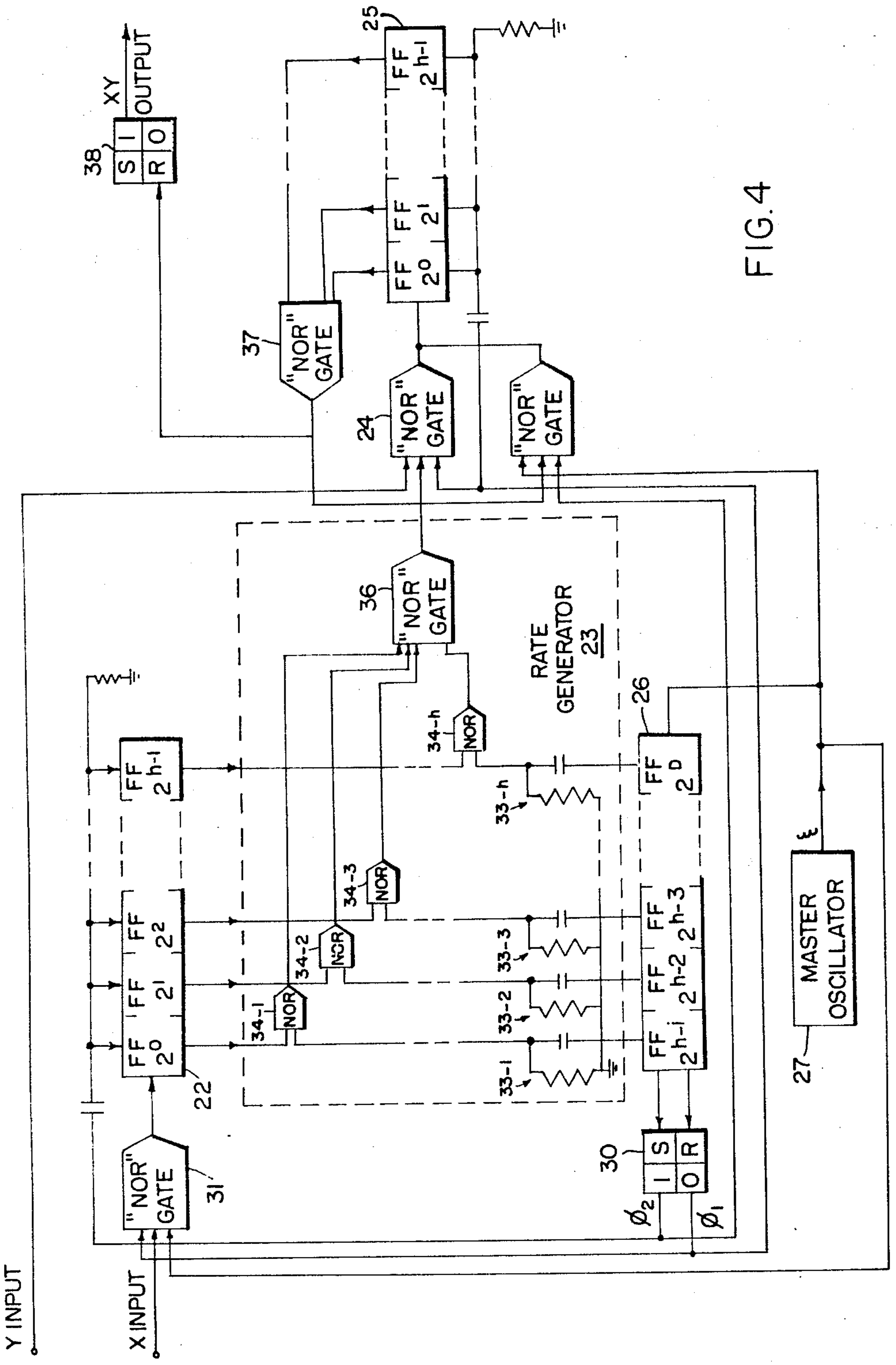
FIGURE 4 is a block diagram of the pulse width multiplier with digital circuit implementation.

FIGURE 4 is a block diagram of a digital embodiment of the FIGURE 1 multiplier. It is comprised of four basic subcombinations: an $x$ input counter 22, a pulse rate generator 23, a $y$ gating circuit 24 and an output counter and logic circuit 25. In addition, a master counter 26 and master ($f_c$) oscillator 27, normally common to a number of multipliers, etc., in the system, are also provided. In general, all the subcombinations can be implemented with flip-flops, "NOR" gates, and simple RC differentiating networks to perform the functions required for the FIGURE 1 multiplier.

The $x$ input signal, in the form of a pulse width modulated signal, is converted to a rate signal in the form of a pulse train in which the average pulse repetition rate is proportional to $x$ by the operation of input counter 22 and rate generator 23. To provide the digital multiplicand signal, the $x$ signal is converted to digital form by counter 22. This is done by counting the pulses from a reference oscillator 27 having a frequency $f_c$ for the time duration of the input pulse proportional to $x$. During alternate computer half cycles, a switching gate 31 is closed by the clock pulse $\phi_2$ from clock 30 to couple the $f_c$ pulses to counter 22. The number of $f_c$ pulses applied is controlled by the pulse width $x$ signal which is also connected to the switching gate 31. The input counter 22 is conveniently comprised of a chain of flip-flops which are arranged to operate as a frequency divider in the usual manner. These flip-flops are binary counter stages which provide a set of parallel binary signals representing $x$. The content of counter 22 increases during the time of pulse width signal $x$ and then stays constant for both the remainder of the half cycle $T_1$ and all of the succeeding half cycle $T_1$.

Figure 5:
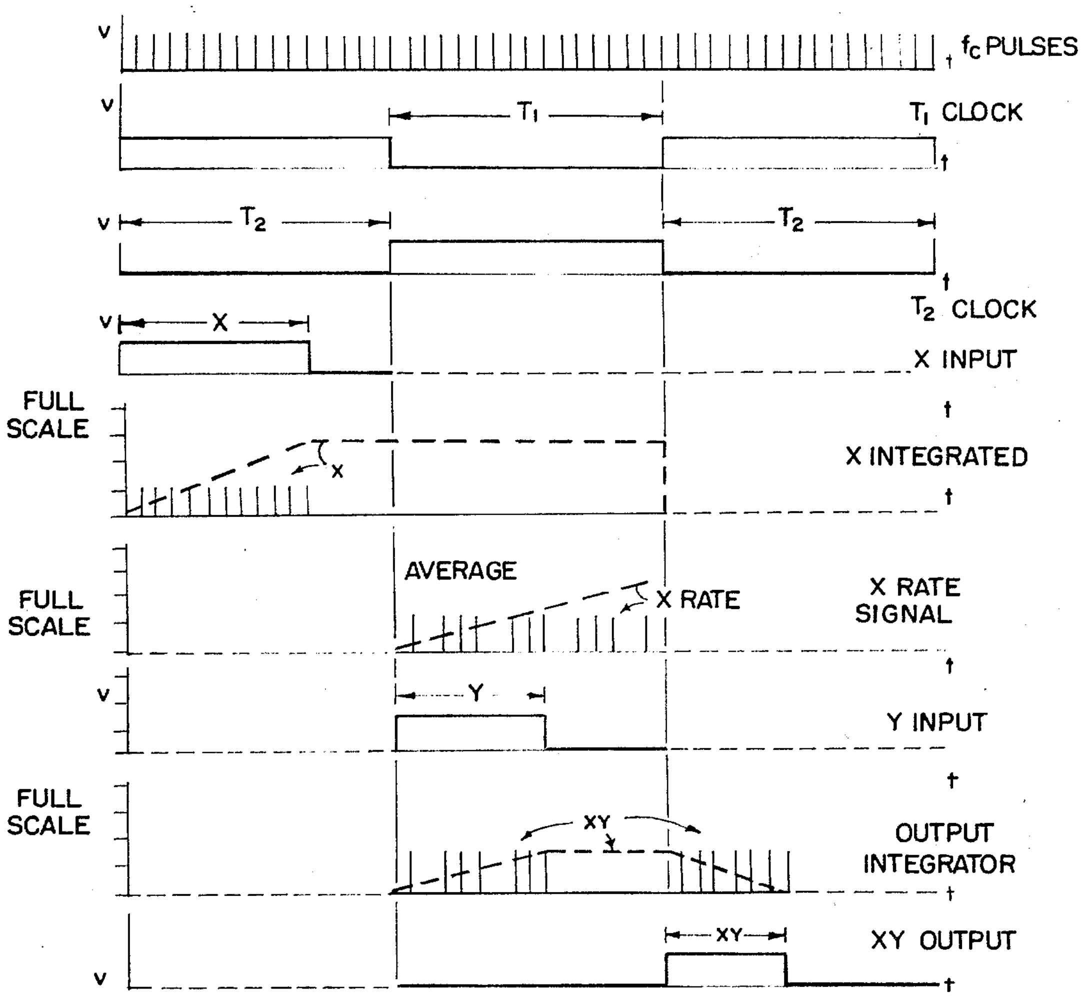
FIGURE 5 is a series of waveform diagrams illustrating the operation of the FIGURE 4 multiplier.

The rate generator 23 during each half cycle $T_1$ produces pulses at a rate proportional to the $x$ count in counter 22. This is done by a set of $n$ pulse-generators wherein each pulse generator produces $2^k$, $k=0, 1, 2, \ldots (n-1)$ pulses for each half cycle $T_1$. That is, a pulse generator is provided for each binary digit in the input number $x$, to generate pulses at a rate corresponding to that digit and the sum of all the proper pulse generator outputs is the desired pulse rate. The pulse generators are provided by the respective stages of the binary frequency divider, the master counter 26. Although the function served is different, master counter 26 can be identical in construction to input counter 22. Because there is a stage in master counter 26 which produces the appropriate $2^k$ pulses for each stage of input counter 22, it is only necessary to gate the proper master counter stage outputs, with the output of the input counter 22, and appropriately combine them. This is done with pulses formed by differentiating the output of each stage of master counter 26 in respective $(n-1)$ RC circuits 33–1, 33–2, 33–4, . . . 33—$(n-1)$ and combining the voltage spikes in "NOR" gate 36, after switching with the respective gates 34–1, 34–2, etc., under the control of input counter 22. Because it is an inherent feature of binary counting that all transitions from the "0" state to the "1" are staggered (in any stage or order). the transition from zero to one can only occur when all the lower orders, if any, are changing from "1" to "0," and because such transitions produce the appropriate binary counter outputs, the rate generator 23 provides appropriate asynchronous rate signals. Actually, the pulses generated in a computer cycle $T_1$ are equal in number to the input $x$. This is illustrated in the diagram of FIGURE 5 in which the operations are shown for a multiplier simplified to $n=4$, $x=11$ or 1011, for illustration purposes. Because the rate generator 23 produces a plurality of rate signals, each corresponding to a binary digit in $x$, the output is the sum of equally spaced groups of "8," "2," and "1" spike pulses. The gaps formed by the absence of the 4 spike pulses for the third order binary digit "4" produce a corresponding reduction in the average rate of spike pulses which is substantially evenly spaced over the period $T_1$.

Multiplication of $x$ by $y$ is therefore directly made by the modulation of the $x$ pulse rate signal by the $y$ pulse-width signal in switching gate 24. The product is integrated in output counter 25 in the same manner as the $x$ pulse-width signal was integrated in counter 22. The switching gate 24 is controlled by the clock pulse signal $\phi_1$ in addition to the $y$ signal so as to pass the $x$ spike pulses to the binary chain counter 25 to produce a total during $T_1$ proportional to the product $xy$.

To provide an output in the form of a pulse width signal, logic circuitry is provided so that during the clock period $T_2$ following integration, a pulse from set-reset flip-flop 38 is generated having a duration proportional to $xy$. This is achieved by initiating the pulse at the beginning of the $T_2$ period by applying the $\phi_1$ clock to flip-flop 38. Simultaneously, counter 25 is emptied by the application of $f_c$ pulses from the reference oscillator 27 and the $xy$ output pulse is terminated when the "NOR" gate 37, operating as a zero comparator, resets flip-flop 38.

The FIGURE 5 waveforms are useful for considering the operation of the FIGURE 4 multiplier embodiment in greater detail. These waveforms are constructed on the simplification to $n=4$ stages for the master counter 26. Typical practical implementation is $n=12$ which provides a full scale resolution of 4096 discrete parts which normally results in an overall accuracy of approximately one part in 5000. To provide about 2 kc. operation, the master oscillator produces pulses at a 10 mc. rate. With present day semiconductor components, logic operations are generally more easily implemented with "NOR" logic. The multiplier circuit of FIGURE 4 reflects this fact. For example, the "NOR" gate 31 is switched closed during the $T_2$ cycle by applying its complement signal $\phi_1$.

While particular embodiments of the invention have been shown and described herein, it is not intended that the invention be limited to such disclosure but that changes and modifications can be made and incorporated within the scope of the claims.

What is claimed is:

1. A computing circuit comprising:

(a) a variable rate generator producing a signal having a magnitude proportional to a first input variable;

(b) means for integrating a signal producing a termination signal indicative of a zero state;

(c) means to supply a fixed rate signal;

(d) switching means interposed between said variable and fixed rate generators and said integrating means for coupling said first input variable rate signal to said integrating means for a time duration proportional to a second input variable and subsequently coupling said fixed rate signal to said integrating means.

2. A method of pulse width multiplication, for signals representing variable data processing quantities comprising:

(a) generating a rate signal which is proportional to a quantity represented by a first input signal;

(b) integrating said rate signal over an integration period proportional to a quantity represented by a second input signal by disconnecting the rate signal whereby signals are stored which are proportional to the product of said first and second input signals;

(c) reading out the stored product signals by applying a reference rate signal;

(d) deriving a pulse width output signal by sensing the termination of reading of said stored product signals.

3. In an analog multiplier circuit for converting electrical signals representing variable quantities by D-C voltage levels to a signal representing the quantity in pulse width form comprising:

(a) an electronic integrator;

(b) input means to apply a voltage modulated signal to said integrator;

(c) a source of a D-C reference voltage having a polarity opposite to that of the input signal;

(d) switching means for coupling said input signal to said integrator during a first period of variable duration; and for subsequently coupling said reference voltage to said integrator to discharge said integrator;

(e) comparator means for sensing a zero voltage level of said integrator for producing a control signal in pulse width and modulation form.

4. In an electronic multiplier circuit:

(a) an integrating capacitor;

(b) a first electronic switch for coupling an input signal to said capacitor for integration from a predetermined level for a variable duration;

(c) a second electronic switch for subsequently coupling a fixed reference signal to said capacitor;

(d) a comparator coupled to said capacitor for sensing a return of said capacitor to said predetermined level for producing an output signal representing the termination of a pulse width output signal.

5. In an analog multiplier computer circuit:

(a) a capacitor;

(b) an operational amplifier coupled to said capacitor to provide an integrator responsive to variable input D-C voltages;

(c) first and second solid state switches for selecting integrator input signals;

(d) first input means for applying first variable pulse width input signal to close said first switch;

(e) second input means receiving the second input signal and applying an integrating current through said first switch;

(f) means to apply a reference discharge current for said integrating means through said second switch;

(g) comparator means for sensing the zero voltage level of said capacitor for producing a control signal in pulse width modulation form.

6. A pulse width multiplier comprising:

(a) a first input counter adapted to receive a first input signal;

(b) a second counter adapted to receive a second input signal, in pulse-width form;

(c) means to apply reference oscillator pulses to said second counter for emptying said second counter;

(d) a digital rate generator including a set of "NOR" gates, each of which is coupled to respective stages in said input counter;

(e) output gating means for said second counter responsive to said second input signals for controlling integration of said rate generator output pulses;

(f) pulse width output means including gating means for generating a pulse width signal during the time said oscillator pulses are emptying said second counter.

References Cited

UNITED STATES PATENTS

| | | | |
|---|---|---|---|
| 2,773,641 | 12/1956 | Baum | 235—194 |
| 2,849,181 | 8/1958 | Lehmann | 235—183 |
| 2,872,109 | 2/1959 | Smith | 235—194 |
| 3,165,650 | 1/1965 | White | 307—88.5 |
| 3,214,735 | 10/1965 | Reuther et al. | 307—88.5 |
| 3,264,457 | 8/1966 | Seegmiller et al. | 332—17 X |

MALCOLM A. MORRISON, Primary Examiner

JOSEPH F. RUGGIERO, Assistant Examiner

U.S. Cl. X.R.

307—229